United States Patent
Urian

(10) Patent No.: US 11,882,101 B2
(45) Date of Patent: Jan. 23, 2024

(54) METHODS AND DEVICES FOR GENERATING A SYMMETRIC SESSION KEY FOR ENCRYPTED COMMUNICATION

(71) Applicant: Infineon Technologies AG, Neubiberg (DE)

(72) Inventor: Rainer Urian, Augsburg (DE)

(73) Assignee: INFINEON TECHNOLOGIES AG, Neubiberg (DE)

(*) Notice: Subject to any disclaimer, the term of this patent is extended or adjusted under 35 U.S.C. 154(b) by 124 days.

(21) Appl. No.: 17/198,302

(22) Filed: Mar. 11, 2021

(65) Prior Publication Data
US 2021/0352054 A1    Nov. 11, 2021

(30) Foreign Application Priority Data
May 5, 2020  (DE) .................... 10 2020 112 102.4

(51) Int. Cl.
*G06F 21/60*  (2013.01)
*H04L 9/08*  (2006.01)
(Continued)

(52) U.S. Cl.
CPC ......... *H04L 63/0435* (2013.01); *G06N 20/00* (2019.01); *H04L 9/0825* (2013.01);
(Continued)

(58) Field of Classification Search
CPC . H04L 63/0435; H04L 9/0825; H04L 9/0869; H04L 9/30; H04L 9/0841;
(Continued)

(56) References Cited

U.S. PATENT DOCUMENTS

| 2015/0200774 A1* | 7/2015 | Le Saint ................... H04L 9/14 |
| | | 713/171 |
| 2017/0237725 A1* | 8/2017 | Camenisch ......... H04L 63/0435 |
| | | 713/171 |

(Continued)

FOREIGN PATENT DOCUMENTS

| EP | 3373505 A1 | 9/2018 | |
| WO | WO-0108348 A1 * | 2/2001 | ............. H04L 63/06 |

(Continued)

OTHER PUBLICATIONS

German Office Action issued for corresponding DE application 10 2020 112 102.4 dated Dec. 9, 2020, 5 pages (for informational purposes only).

(Continued)

*Primary Examiner* — Joseph P Hirl
*Assistant Examiner* — Aayush Aryal
(74) *Attorney, Agent, or Firm* — VIERING, JENTSCHURA & PARTNER mbB

(57) ABSTRACT

According to one embodiment, a method performed by a first communication device for generating a symmetric session key for encrypted communication with a second communication device is described comprising generating a blinding value for each of a first and a second private key component, generating a blinded public key from the first private key component, the second private key component, and the blinding values using a public key generation function, transmitting the blinded public key to the second communication device for encryption of a shared secret, receiving the shared secret, generating a session key for encrypted communication with the second communication device from the shared secret, encrypting, using the session key, an information from which the blinding values are (Continued)

derivable and transmitting the encrypted information to the second communication device.

20 Claims, 5 Drawing Sheets

(51) Int. Cl.
    *H04L 9/30*     (2006.01)
    *H04L 9/32*     (2006.01)
    *H04L 9/40*     (2022.01)
    *G06N 20/00*    (2019.01)

(52) U.S. Cl.
    CPC .............. *H04L 9/0869* (2013.01); *H04L 9/30* (2013.01); *H04L 9/0841* (2013.01)

(58) Field of Classification Search
    CPC ..... H04L 9/3006; H04L 9/3234; G06N 20/00; G06F 21/606
    See application file for complete search history.

(56) References Cited

U.S. PATENT DOCUMENTS

| | | | |
|---|---|---|---|
| 2019/0245695 A1* | 8/2019 | Le Saint | H04L 9/088 |
| 2019/0386828 A1* | 12/2019 | Garcia Morchon | G06F 7/582 |
| 2020/0067707 A1* | 2/2020 | Resch | H04L 9/0841 |
| 2022/0078011 A1* | 3/2022 | Garcia Morchon | H04L 9/0841 |

FOREIGN PATENT DOCUMENTS

| | | | |
|---|---|---|---|
| WO | WO-2017004470 A1 * | 1/2017 | H04L 63/0428 |
| WO | 2020053013 A1 | 3/2020 | |

OTHER PUBLICATIONS

Garrett, Duncan et al., "Blinded Diffie-Hellman—Preventing Eavesdroppers from Tracking Payments", 2014, L. Chen and C. Mitchell (Eds.), Springer International Publishing Switzerland, pp. 79-92.

Garrett, Duncan et al., "Blinded Diffie-Hellman: Preventing Eavesdroppers from Tracking Payments"—Power Point Presentation, 2014, EMVCo Security Working Group, 25 pages.

Urian, Rainer, "Understanding NewHope Simple", Infineon Technologies AG, 25 pages.

* cited by examiner

METHODS AND DEVICES FOR GENERATING A SYMMETRIC SESSION KEY FOR ENCRYPTED COMMUNICATION

CROSS-REFERENCE TO RELATED APPLICATION

This application claims priority to German Patent Application Serial No. 10 2020 112 102.4, which was filed May 5, 2020, and is incorporated herein by reference in its entirety.

TECHNICAL FIELD

The present disclosure relates to methods and devices for generating a symmetric session key for encrypted communication.

BACKGROUND

With the development of quantum computers, it is desirable to move away from classical asymmetric cryptosystems like RSA (Rivest Shamir Adleman) and ECC (Elliptic Curve Cryptography) to schemes which cannot be attacked by quantum computers. Currently, quantum computers are not available due to the technical complexity and engineering challenges but once built, they would be able to break RSA and ECC in polynomial time. As a consequence, alternative schemes are investigated. One class of schemes that are supposed to resist attacks by quantum computers are Learning With Errors (LWE)-based schemes.

In addition to being secure, cryptographic schemes like session key agreement (or generation) protocols should protect the user's privacy.

Accordingly, cryptographic protocols which are secure in the quantum-computer era and protect a user's privacy are desirable.

SUMMARY

According to one embodiment, a method performed by a first communication device for generating a symmetric session key for encrypted communication with a second communication device is provided including generating a blinding value for a first private key component and a blinding value for a second private key component, generating a blinded public key from the first private key component, the second private key component, the blinding value for the first private key component and the blinding value for the second private key component using a public key generation function, transmitting the blinded public key to the second communication device for encryption of a shared secret generated by the second communication device, receiving the shared secret from the second communication device, generating a session key for encrypted communication with the second communication device from the shared secret, encrypting, using the session key, an information from which the blinding value for the first private key component and the blinding value for the second private key component are derivable by the second communication device and transmitting the encrypted information to the second communication device.

According to another embodiment, a method for generating a symmetric session key for encrypted communication with a first communication device, the method being performed by a second communication device, is provided, including receiving a blinded public key from the first communication device, generating a shared secret, encrypting the shared secret using the blinded public key, transmitting the encrypted shared secret to the first communication device, generating a session key for encrypted communication with the first communication device from the shared secret, receiving encrypted information from the first communication device, decrypting the information using the session key and deriving a blinding value for a first private key component of the first communication device and a blinding value for a second private key component of the first communication device from the information and verifying that the received blinded public key is a public key of the first communication device using the blinding value for the first private key component and the blinding value for the second private key component.

According to further embodiments, communication devices according to the above methods are provided.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
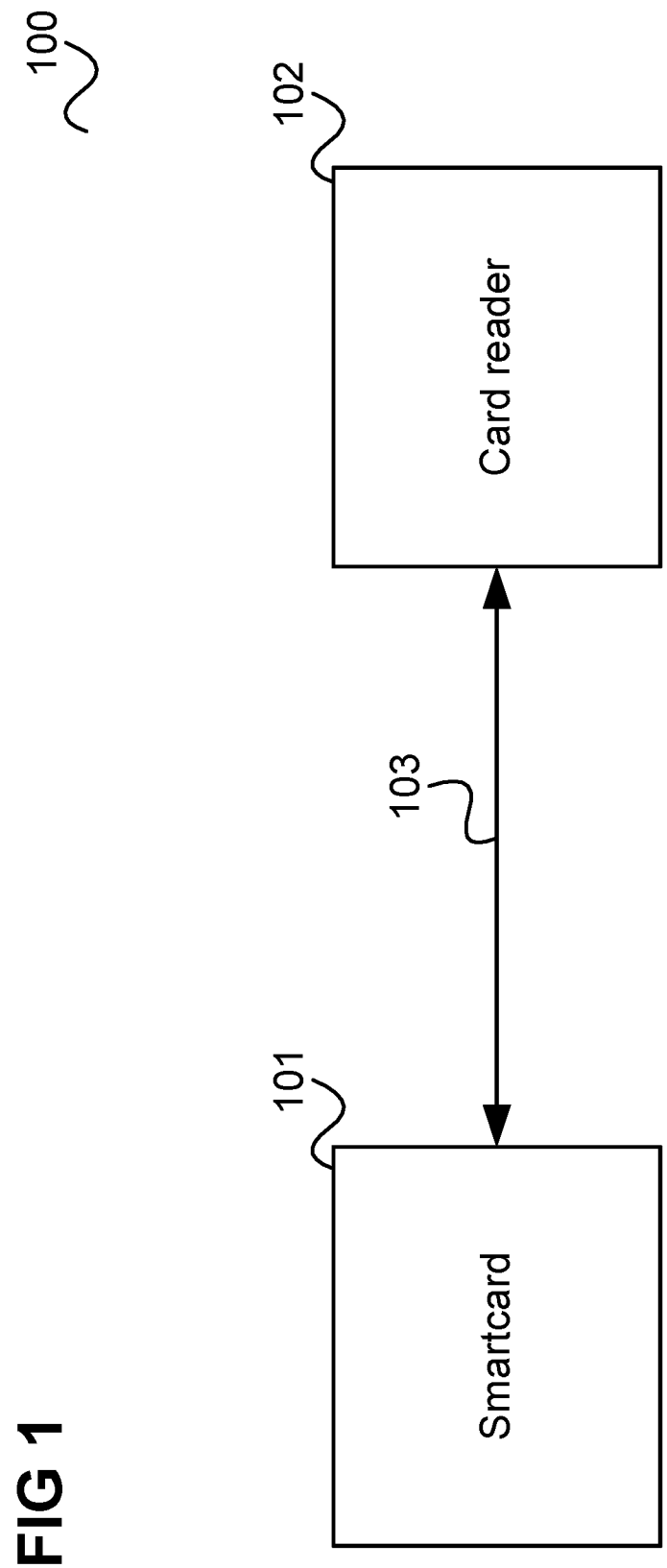
FIG. 1 shows a communication arrangement according to an embodiment.

FIG. 1 shows a communication arrangement 100 according to an embodiment.

The communication arrangement 100 includes a smart card 101 as a first communication device (or communication party) and a card reader 102 as a second communication device (or communication party).

The smart card 101 is for example a debit or credit card and the card reader 102 is part of a corresponding terminal such as an ATM (Automated Teller Machine) or a Point-of-Sale (POS) terminal.

Although the above example relates to a chip card and a card reader, it should be noted that embodiments may be also be applied to other scenarios where one or both of the communication parties 101, 102 are implemented by other processing and/or communication devices like a personal computer, microcontroller, smart card, secure microcontroller, hardware root of trust, (embedded) secure element (ESE), Trusted Platform Module (TPM), or Hardware Security Module (HSM).

One application example is electronic payment where a user of smart card 101 wants to pay (i.e. use a payment service) at the card reader 102. For this, a communication channel 103 is establishment for exchange of corresponding messages. The communication channel 103 (which may be contact-based or contact-less) should be secure for authentication of the smart card 101 at the reader 102, protection against modifications of messages and protection against eavesdropping.

A typical approach to establish a secure communication channel is to a generate a session key between the communication parties 101, 102 in accordance with a key agreement protocol. Messages may then be exchanged securely by encrypting them on the sender side and decrypting them on the receiver side using the session key.

An example for a key exchange protocol is static-ephemeral Diffie-Hellman protocol. In this protocol, the first communication device "Alice" (here and in the following examples e.g. corresponding to smart card 101) has a long term public/private key pair and the second communication device "Bob" (here and in the following examples e.g. corresponding to card reader 102) uses an ephemeral public/private key pair (i.e. a key pair only used for one communication session). The static-ephemeral Diffie-Hellman protocol can be written as follows:

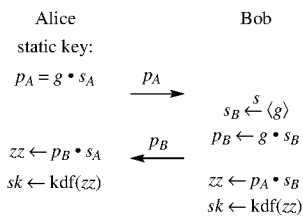

Herein, the dollar sign "$" denotes sampling and the angle brackets <g> denote the set generated by generator g (according to elliptic curve cryptography). Here and in the following protocol representations, the long arrows between Alice and Bob denote transmission of messages in the indicated direction including the elements denoted above the arrows (e.g. over communication channel 103).

$s_k$ denotes the session key and kdf denotes a key generation function (applied to the shared secret zz). Key generation may for example include application of a hash function and selection of some of the bits of the hash result.

The key agreement protocol has the following two purposes:
(1) negotiation of a shared (symmetric) key $s_k$ between Alice and Bob
(2) authentication of Alice to Bob However, the above protocol has a privacy problem: in the first message (from Alice to Bob) the public key $p_A$ of Alice is transmitted in plain. An eavesdropper Eve can therefore identify Alice by her public key.

Another issue is that classical asymmetric cryptosystems like RSA (Rivest Shamir Adleman) and ECC (Elliptic Curve Cryptography) can be attacked by quantum computers. Currently, quantum computers are not available due to the technical complexity and engineering challenges. However, once built, they would be able to break RSA and ECC in polynomial time.

Thus, with the advent of powerful quantum computers, it is desirable to replace protocols based on the Diffie-Hellman key agreement by alternative ones which are resistant to quantum computer attacks. A promising family of such key agreement schemes are based on the learning with errors (LWE) problem. In the following, approaches are described which allow session key generation which is resistant against quantum computer attacks and which avoid the above privacy problem of a static public key being transmitted in plain (i.e. unencrypted).

There exists many variants of LWE protocols. Therefore, in the following, a generic formulation is given which can be mapped to many LWE variants.

Let $\mathcal{R}$ be a ring with unity. Let $\mathcal{V} := \mathcal{R}^{n \times m}$ denote an n×m matrix over $\mathcal{R}$ and $\mathcal{M} := \mathcal{R}^{n \times m}$ an n×n matrices over $\mathcal{R}$.

Let $\psi_\mathcal{R}$ denote some probability distribution over $\mathcal{R}$ and $\psi_\mathcal{V}$ some probability distribution over $\mathcal{V}$. Let g be some element from $\mathcal{M}$. Then a private key is the pair (z, e) $\in \mathcal{V}^2$, where the components are sampled from $\mathcal{V}$ according to $\psi_\mathcal{V}$. The corresponding public key is calculated as g·s+e, where the dot denotes usual multiplication of the matrix g by the module element s. This means that the public key generation function is a linear mapping of a first private key component s disturbed by a second private key component e.

The parameter g can be considered as part of the public key or as a global system parameter. In many LWE protocols, g is considered as a part of the public key. However, for blinding LWE protocols, it is typically more natural to consider it as a system parameter. But it is also possible to use the blinded LWE protocols with g as an additional part of the public key. In the following, g is treated as a system parameter.

A public/private key pair is then defined as:

$$(s, e) = \xleftarrow{\$} \psi_V \times \psi_V$$
$$p \leftarrow g \cdot s + e$$

A generic LWE symmetric session key generation protocol can be written as follows:

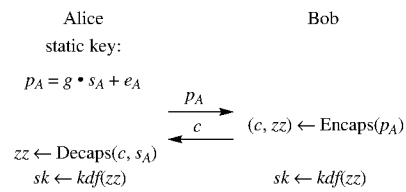

The Encaps($p_A$) function takes as input a public key $p_A$. It randomly generates a shared secret zz and encrypts it with the public key $p_A$ to the cipher token c. The function returns the shared secret zz and the cipher token c.

The Decaps(c, $s_A$) function takes as input the cipher token c from Bob and the private key $s_A$ from Alice. It decrypts the shared secret zz from c and $s_A$. According to one embodiment, these are the CCA2 (Chosen Ciphertext Attack) versions of the Encaps and Decaps functions.

Examples for learning with error (LWE) cryptographic systems are
- Frodo, where $\mathcal{R} := \mathbb{Z}_p$, $\mathcal{Z} := \mathcal{R}^{n \times n}$, $\mathcal{M} := \mathcal{R}^{n \times m}$ with large n
- NewHope, where $\mathcal{R} := \mathbb{Z}_p[x]/(x^d+1)$, $\mathcal{V} := \mathcal{M} = \mathcal{R}$ with large d
- Kyber, where $\mathcal{R} := \mathbb{Z}_{p^2}[x]/(x^d+1)$, $\mathcal{V} := \mathcal{R}^n$, $\mathcal{M} := \mathcal{R}^{n \times n}$ with medium sized d and small sized n.

For example, in NewHope the functions Encaps and Decaps are given as follows:

Encaps:

$$s_B, e_B \xleftarrow{\$} \psi_k, \psi_k$$
$$p_B \leftarrow g \cdot s_B + e_B$$
$$e'_B \xleftarrow{\$} \psi_k$$
$$zz_B \xleftarrow{\$} \{0, 1\}^n$$
$$m_B \leftarrow \text{Encode}(zz_B)$$
$$c \leftarrow p_A \cdot s_B + e'_B + m_B$$

Decaps:

$$m_A \leftarrow c - p_B \cdot s_A$$
$$zz_A \leftarrow \text{Decode}(m_A)$$

It should be noted that Bob transmits, in addition to c, its public key $p_B$ to Alice.

It can be shown that with suitable functions Encode and Decode (to encode bits to polynomial coefficients and vice versa) it holds that $zz_A = zz_B$.

In the generic LWE symmetric session key generation protocol given above, the first communication device ("Alice") transmits its public key $p_A$ in plain. As mentioned above, this may be undesirable for privacy purposes. Therefore, according to various embodiments, a blinded LWE is used for session key generation.

A blinded generic LWE protocol according to an embodiment can be written as follows.

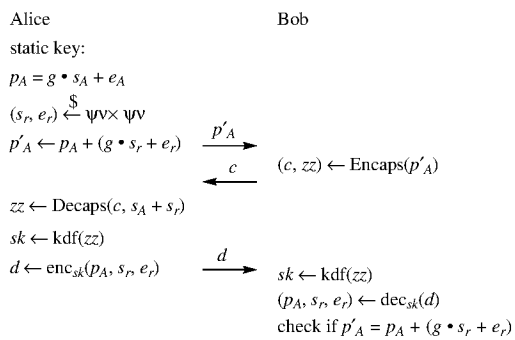

The functions $\text{enc}_{sk}$ and $\text{dec}_{sk}$ refer to encryption and decryption, respectively, using the session key sk.

It can be seen that for blinding, a pair of blinding values $(s_r, e_r)$ is used which is sampled from $\psi \mathcal{V} \times \psi \mathcal{V}$ and which can be seen to be used to blind the private key components $s_A$ and $e_A$ which results in a blinding of the public key $p_A$ to $p_A'$, such that only a blinded public key is transmitted which an attacker cannot associate with Alice (since with each session, the blinding is different due to the sampling of the blinding pair $(s_r, e_r)$.

It should be noted that with the checking performed by Bob at the end of the protocol, Bob verifies that the blinded public key $p_A'$ really corresponds to Alice (to avoid that Bob exchanges messages with an impostor). Bob may know that $p_A$ really corresponds to Alice (i.e. is truly the public key of Alice rather than an impostor's public key) by being provided with Alice's public key $p_A$ (e.g. by Alice) in form of a public key certificate.

In the above blinded LWE protocol is the last protocol message from Alice to Bob contains two elements $(s_r, e_r)$, which is quite expensive in terms of transmission resources. A possibility to reduce this size is to generate $(s_r, e_r)$ pseudo-randomly from a seed value. Thus, it suffices to transmit the (small) seed value in the last message. From the seed, Bob can reconstruct the correct blinding key.

A corresponding protocol (blinded LWE with seed) can be written as follows.

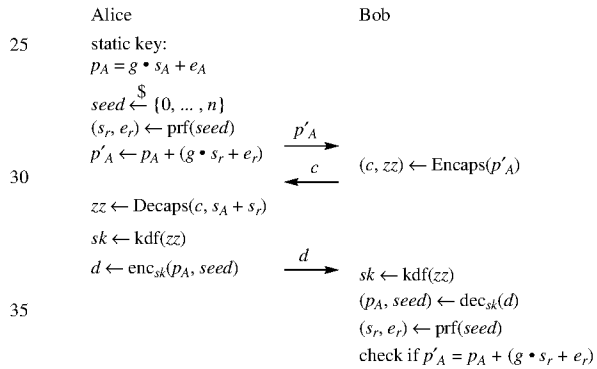

The prf(seed) function is a pseudo-random function which constructs from a uniformly random seed a pair of values $(s_r, e_r)$ which is indistinguishable from a pair of elements randomly sampled from $\psi \mathcal{V} \times \psi \mathcal{V}$.

Figure 2:
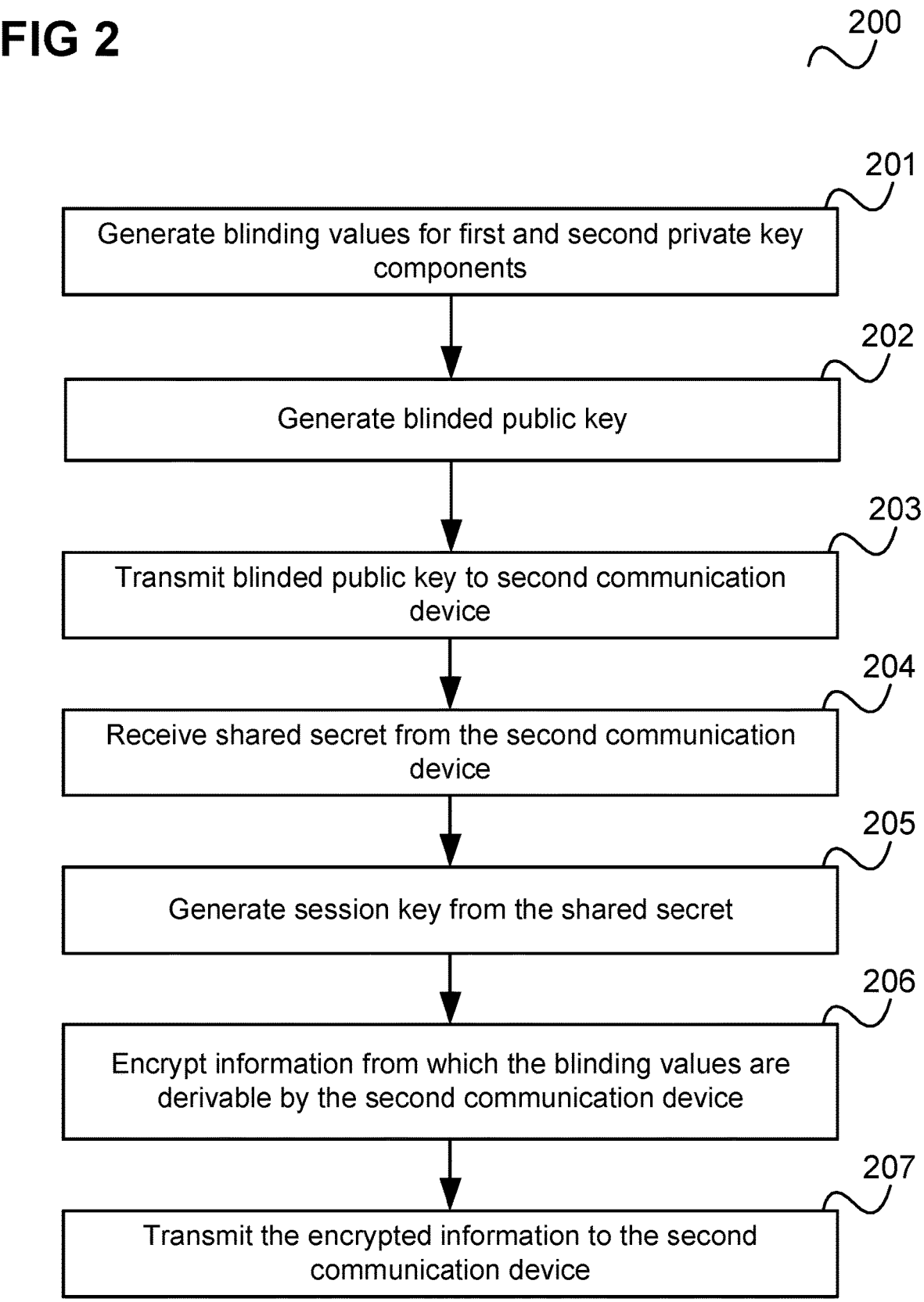
FIG. 2 shows a flow diagram illustrating a method performed by a first communication device for generating a symmetric session key for encrypted communication with a second communication device.

In summary, according to various embodiments, a method is provided as illustrated in FIG. 2.

FIG. 2 shows a flow diagram 200 illustrating a method performed by a first communication device for generating a symmetric session key for encrypted communication with a second communication device.

In 201, the first communication device generates a blinding value for a first private key component and a blinding value for a second private key component;

In 202, the first communication device generates a blinded public key from the first private key component, the second private key component, the blinding value for the first private key component and the blinding value for the second private key component using a public key generation function.

In 203, the first communication device transmits the blinded public key to the second communication device for encryption of a shared secret generated by the second communication device.

In 204, the first communication device receives the shared secret from the second communication device.

In 205, the first communication device generating a session key for encrypted communication with the second communication device from the shared secret.

In 206, the first communication device encrypts, using the session key, an information from which the blinding value for the first private key component and the blinding value for the second private key component are derivable by the second communication device.

In 207, the first communication device transmits the encrypted information to the second communication device.

According to various embodiments, in other words, the first communication device alters the private key components ($s_A$ and $e_A$ in the above examples) by random values such that the public key generated from them (i.e. generated for the private key given by the private key components) is blinded (or masked), i.e. differs from the public key corresponding to the private key given by the unaltered private key components. Blinding may be understood as masking. For example, a random value is added to a value to be blinded (or masked). A random value (for this and possibly other purposes) may be provided by a random number generator, for example on basis of a seed input to the random number generator. Multiple types of randomness sources may be used, e.g. a noise generator.

The method may further include encrypting, using the session key, a public key generated from the first private key component and the second private key component using the public key generation function and transmitting the encrypted public key to the second communication device. Alternatively, this may be done in form of a certificate (e.g. X.509).

Figure 3:
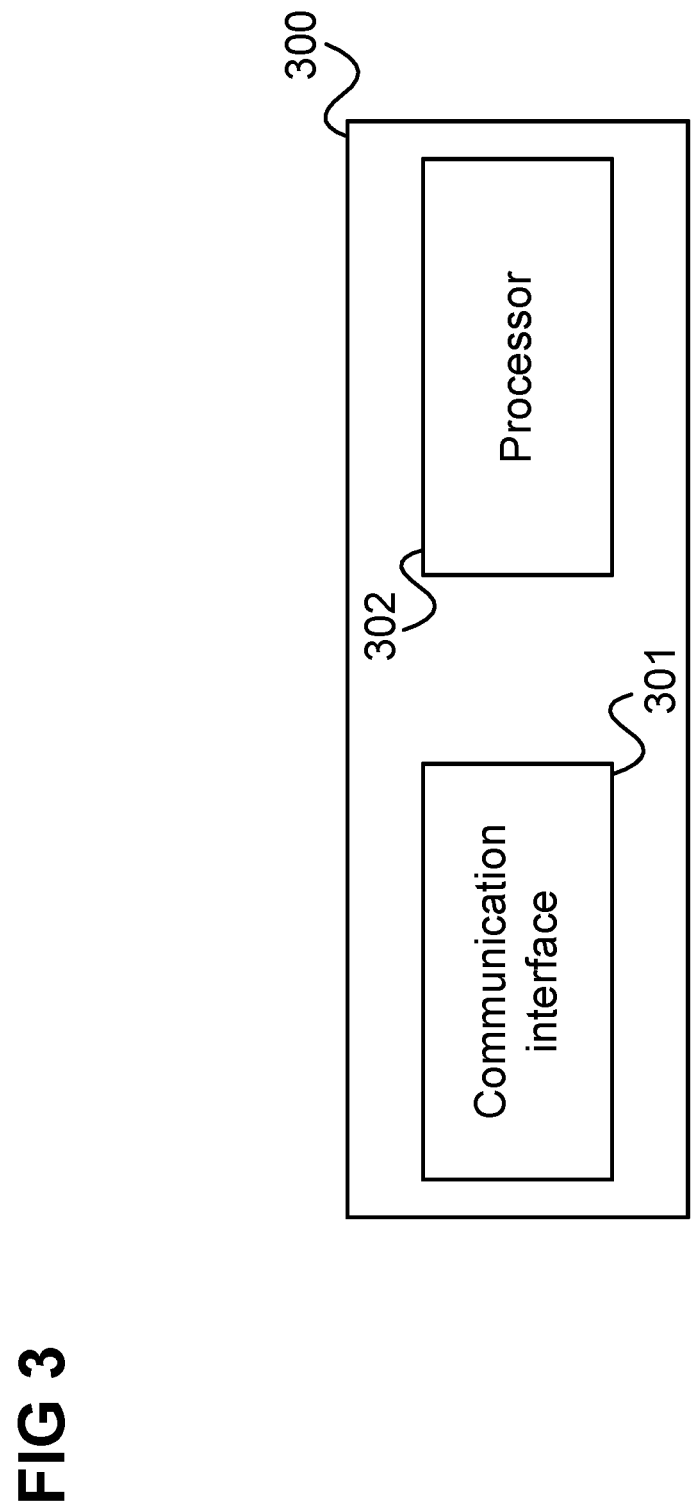
FIG. 3 shows a communication device according to an embodiment.

The method of FIG. 2 is for example performed by a communication device as illustrated in FIG. 3.

FIG. 3 shows a communication device 300 according to an embodiment.

The communication device 300 includes a communication interface 301 (e.g. for communication via a wired or wireless communication network or communication connection with another communication device) and a processor 302.

The processor 302 is configured to generate a blinding value for a first private key component and a blinding value for a second private key component, generate a blinded public key from the first private key component, the second private key component, the blinding value for the first private key component and the blinding value for the second private key component using a public key generation function, transmit the blinded public key to another communication device by means of the communication interface for encryption of a shared secret generated by the other communication device, receive the shared secret from the other communication device by means of the communication interface, generate a session key for encrypted communication with the other communication device from the shared secret, encrypt, using the session key, an information from which the blinding value for the first private key component and the blinding value for the second private key component are derivable by the other communication device and transmit the encrypted information to the other communication device by means of the communication interface.

Figure 4:
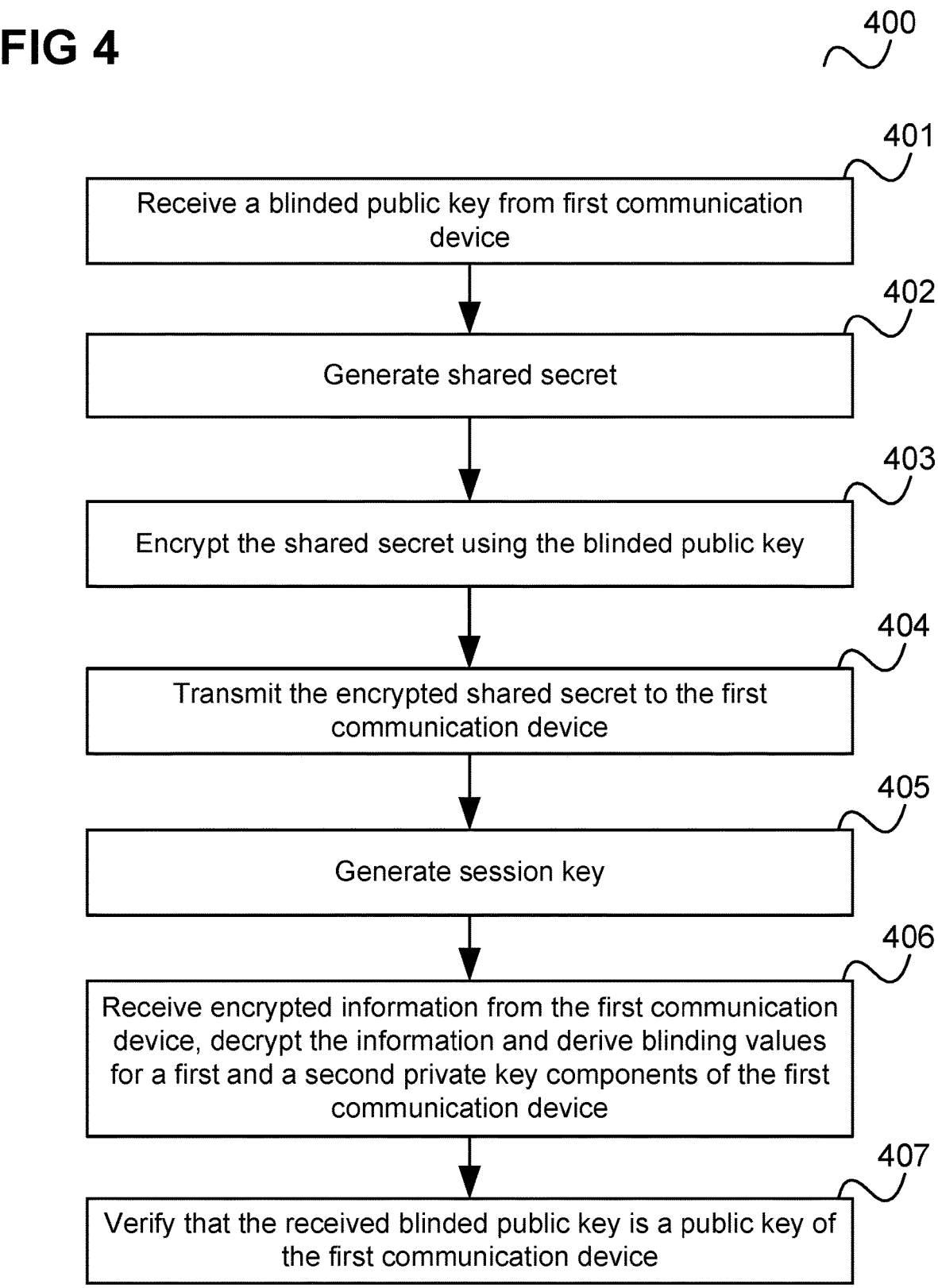
FIG. 4 shows a flow diagram illustrating a method for generating a symmetric session key for encrypted communication with a first communication device, being performed by a second communication device.

Further, according to various embodiments, the counterpart method is provided as illustrated in FIG. 4.

FIG. 4 shows a flow diagram 400 illustrating a method being performed by a second communication device for generating a symmetric session key for encrypted communication with a first communication device.

In 401, the second communication device receives a blinded public key from the first communication device.

In 402, the second communication device generates a shared secret.

In 403, the second communication device encrypts the shared secret using the blinded public key.

In 404, the second communication device transmits the encrypted shared secret to the first communication device.

In 405, the second communication device generates a session key for encrypted communication with the first communication device from the shared secret.

In 406, the second communication device receives encrypted information from the first communication device, decrypting the information using the session key and deriving a blinding value for a first private key component of the first communication device and a blinding value for a second private key component of the first communication device from the information.

In 407, the second communication device verifies that the received blinded public key is a public key of the first communication device using the blinding value for the first private key component and the blinding value for the second private key component.

Figure 5:
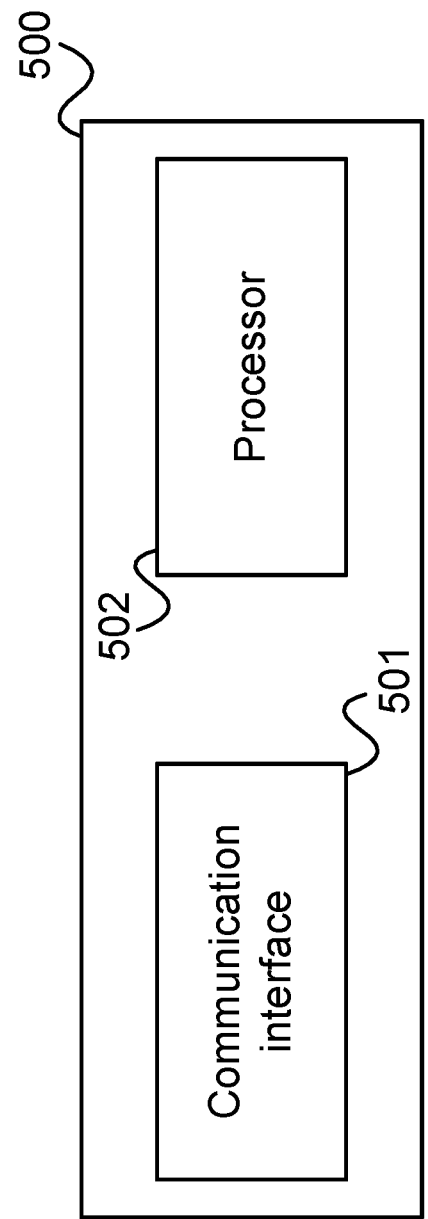
FIG. 5 shows a communication device according to an embodiment.

The method of FIG. 4 is for example performed by a communication device as illustrated in FIG. 5.

FIG. 5 shows a communication device 500 according to an embodiment.

The communication device 500 includes a communication interface 501 (e.g. for communication via a wired or wireless communication network or communication connection with another communication device) and a processor 502.

The processor 502 is configured to receive a blinded public key from another communication device, generate a shared secret, encrypt the shared secret using the blinded public key, transmit the encrypted shared secret to the other communication device, generate a session key from the shared secret, receive encrypted information from the other communication device, decrypt the information using the session key and derive a blinding value for a first private key component of the other communication device and a blinding value for a second private key component of the other communication device from the information and verify that the received blinded public key is a public key of the other communication device using the blinding value for the first private key component and the blinding value for the second private key component.

The methods may be performed and the communication devices may be implemented (in particular the processors) using one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment. In particular, the "processors" of the above communication device may or may not be programmable processors, for example operating according to a computer program stored in a memory of the respective communication device.

Various Examples are described in the following:

Example 1 is a method as illustrated in FIG. 2.

Example 2 is the method of Example 1, wherein receiving the shared secret from the second communication device includes receiving the encrypted shared secret from the second communication device and decrypting the encrypted shared secret using at least the first private key component.

Example 3 is the method of Example 1 or 2, including generating the blinding value for the first private key component and the blinding value for the second private key component by random sampling.

Example 4 is the method of any one of Examples 1 to 3, wherein the information is the blinding value for the first private key component and the blinding value for the second private key component.

Example 5 is the method of any one of Examples 1 to 4, including randomly sampling a seed value and generating the blinding value for the first private key component and the blinding value for the second private key component from the seed value, wherein the information from which the blinding value for the first private key component and the blinding value for the second private key component are derivable by the second communication device is the seed value.

Example 6 is the method of any one of Examples 1 to 5, further including generating the first private key component and the second private key component and generating a public key from the first private key component and the second private key component using the public key generation function.

Example 7 is the method of any one of Examples 1 to 6, further including encrypting, using the session key, a public key generated from the first private key component and the second private key component using the public key generation function and transmitting the encrypted public key to the second communication device.

Example 8 is the method of Example 7, wherein the public key is encrypted and transmitted together with the information from which the blinding value for the first private key component and the blinding value for the second private key component are derivable by the second communication device.

Example 9 is the method of any one of Examples 1 to 8, wherein the public key generation function is a learning with errors public key generation function.

Example 10 is the method of any one of Examples 1 to 9, wherein the public key generation function is a linear mapping of an input first private key component or blinded first private key component disturbed by an input second private key component or blinded second private key component.

Example 11 is the method of Example 10, wherein the linear mapping is given by a public key generation system parameter.

Example 12 is the method of Example 11, wherein the first private key component, the second private key component, the blinding value for the first private key component and the blinding value for the second private key component are components of the same ring or of the same matrix ring over a ring.

Example 13 is the method of Example 12, wherein the generation system parameter is a component of the same ring or is a matrix over the ring.

Example 14 is the method of Example 12 or 13, wherein the ring is a finite field.

Example 15 is the method of Example 12 or 13, wherein the ring is the residue class ring over some integer.

Example 16 is the method of Example 12 or 13, wherein the ring is a polynomial ring.

Example 17 is the method of any one of Examples 1 to 16, including generating the session key from the shared secret by application of a key derivation function to the shared secret.

Example 18 is the method of any one of Examples 1 to 17, including performing communication with the second communication device using the session key.

Example 19 is a communication device as illustrated in FIG. 3.

Example 20 is the communication device of Example 19, wherein receiving the shared secret from the second communication device includes receiving the encrypted shared secret from the second communication device and decrypting the encrypted shared secret using at least the first private key component.

Example 21 is the communication device of Example 19 or 20, wherein the processor is configured to generate the blinding value for the first private key component and the blinding value for the second private key component by random sampling.

Example 22 is the communication device of any one of Examples 19 to 21, wherein the information is the blinding value for the first private key component and the blinding value for the second private key component.

Example 23 is the communication device of any one of Examples 19 to 22, wherein the processor is configured to randomly sample a seed value and generate the blinding value for the first private key component and the blinding value for the second private key component from the seed value, wherein the information from which the blinding value for the first private key component and the blinding value for the second private key component are derivable by the second communication device is the seed value.

Example 24 is the communication device of any one of Examples 19 to 23, wherein the processor is further configured to generate the first private key component and the second private key component and to generate a public key from the first private key component and the second private key component using the public key generation function.

Example 25 is the communication device of any one of Examples 19 to 24, wherein the processor is further configured to encrypt, using the session key, a public key generated from the first private key component and the second private key component using the public key generation function and to transmit the encrypted public key to the second communication device.

Example 26 is the communication device of Example 25, wherein the processor is configured to encrypt and transmit the public key together with the information from which the blinding value for the first private key component and the blinding value for the second private key component are derivable by the second communication device.

Example 27 is the communication device of any one of Examples 19 to 26, wherein the public key generation function is a learning with errors public key generation function.

Example 28 is the communication device of any one of Examples 19 to 27, wherein the public key generation function is a linear mapping of an input first private key component or blinded first private key component disturbed by an input second private key component or blinded second private key component.

Example 29 is the communication device of Example 28, wherein the linear mapping is given by a public key generation system parameter.

Example 30 is the communication device of Example 29, wherein the first private key component, the second private key component, the blinding value for the first private key component and the blinding value for the second private key component are components of the same ring or of the same matrix ring over a ring.

Example 31 is the communication device of Example 30, wherein the generation system parameter is a component of the same ring or is a matrix over the ring.

Example 32 is the communication device of Example 30 or 31, wherein the ring is a finite field.

Example 33 is the communication device of Example 30 or 31, wherein the ring is the residue class ring over some integer.

Example 34 is the communication device of Example 30 or 31, wherein the ring is a polynomial ring.

Example 35 is the communication device of any one of Examples 19 to 34, wherein the processor is configured to generate the session key from the shared secret by application of a key derivation function to the shared secret.

Example 36 is the communication device of any one of Examples 19 to 35, wherein the processor is configured to perform communication with the second communication device via the communication interface using the session key.

Example 37 is a method as illustrated in FIG. 4.

Example 38 is the method of Example 37, including performing communication with the first communication device using the session key if it has been successfully verified that the received blinded public key is a public key of the first communication device.

Example 39 is a communication device as illustrated in FIG. 5.

Example 40 is the communication device of Example 39, wherein the processor is configured to perform communication with the first communication device using the session key via the communication interface if it has successfully verified that the received blinded public key is a public key of the first communication device.

According to a further Example, a communication device is provided including generating means for generating a blinding value for a first private key component and a blinding value for a second private key component, generating means for generating a blinded public key from the first private key component, the second private key component, the blinding value for the first private key component and the blinding value for the second private key component using a public key generation function, transmitting means for transmitting the blinded public key to the second communication device for encryption of a shared secret generated by the second communication device, receiving means for receiving the shared secret from the second communication device, generating means for generating a session key for encrypted communication with the second communication device from the shared secret, encrypting means for encrypting, using the session key, an information from which the blinding value for the first private key component and the blinding value for the second private key component are derivable by the second communication device and transmitting means for transmitting the encrypted information to the second communication device.

According to a further Example, a communication device is provided including receiving means for receiving a blinded public key from the first communication device, generating means for generating a shared secret, encrypting means for encrypting the shared secret using the blinded public key, transmitting means for transmitting the encrypted shared secret to the first communication device, generating means for generating a session key for encrypted communication with the first communication device from the shared secret, receiving means for receiving encrypted information from the first communication device, decrypting the information using the session key and deriving a blinding value for a first private key component of the first communication device and a blinding value for a second private key component of the first communication device from the information and verifying means for verifying that the received blinded public key is a public key of the first communication device using the blinding value for the first private key component and the blinding value for the second private key component.

According to further Examples, computer readable media and/or computer program elements are provided including instructions, which, when executed by one or more processors, make the processors perform one or both of the methods of FIG. 2 and FIG. 4.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

REFERENCE SIGNS

100 Communication arrangement
101 Smartcard
102 Card reader
200 Flow diagram
201-207 Processing
300 Communication device
301 Communication interface
302 Processor
400 Flow diagram
401-407 Processing
500 Communication device
501 Communication interface
502 Processor

What is claimed is:

1. A method performed by a first communication device for generating a symmetric session key for encrypted communication with a second communication device comprising:

Generating a blinding value $s_r$ for a first private key component and a blinding value $e_r$ for a second private key component wherein the blinding value $s_r$ for the first private key component is a value to be combined with the first private key component to mask the first private key component and wherein the blinding value $e_r$ for the second private key component is a value to be combined with the second private key component to mask the second private key component;

Generating a blinded public key from the first private key component, the second private key component, the blinding value $s_r$ for the first private key component and the blinding value $e_r$ for the second private key component using a public key generation function;

Transmitting the blinded public key to the second communication device for encryption of a shared secret generated by the second communication device;

Receiving the shared secret from the second communication device;

Generating the session key for encrypted communication with the second communication device from the shared secret;

Encrypting, using the session key, an information from which the blinding value $s_r$ for the first private key component and the blinding value $e_r$ for the second private key component are derivable by the second communication device; and Transmitting the encrypted information to the second communication device.

2. The method of claim 1, wherein receiving the shared secret from the second communication device comprises receiving the encrypted shared secret from the second communication device and decrypting the encrypted shared secret using at least the first private key component.

3. The method of claim 1, comprising generating the blinding value $s_r$ for the first private key component and the blinding value $e_r$ for the second private key component by random sampling.

4. The method of claim 1, wherein the information is the blinding value $s_r$ for the first private key component and the blinding value $e_r$ for the second private key component.

5. The method of claim 1, comprising randomly sampling a seed value and generating the blinding value $s_r$ for the first private key component and the blinding value $e_r$ for the second private key component from the seed value, wherein the information from which the blinding value $s_r$ for the first private key component and the blinding value $e_r$ for the second private key component are derivable by the second communication device is the seed value.

6. The method of claim 1, further comprising generating the first private key component and the second private key component and generating a public key from the first private key component and the second private key component using the public key generation function.

7. The method of claim 1, further comprising encrypting, using the session key, a public key generated from the first private key component and the second private key component using the public key generation function and transmitting the encrypted public key to the second communication device.

8. The method of claim 7, wherein the public key is encrypted and transmitted together with the information from which the blinding value $s_r$ for the first private key component and the blinding value $e_r$ for the second private key component are derivable by the second communication device.

9. The method of claim 1, wherein the public key generation function is a learning with errors public key generation function.

10. The method of claim 1, wherein the public key generation function is a linear mapping of an input first private key component or blinded first private key component disturbed by an input second private key component or blinded second private key component.

11. The method of claim 10, wherein the linear mapping is given by a public key generation system parameter.

12. The method of claim 11, wherein the first private key component, the second private key component, the blinding value $s_r$ for the first private key component and the blinding value $e_r$ for the second private key component are components of the same ring or of the same matrix ring over a ring.

13. The method of claim 12, wherein the generation system parameter is a component of the same ring or is a matrix over the ring.

14. The method of claim 12, wherein the ring is a finite field.

15. The method of claim 1, comprising generating the session key from the shared secret by application of a key derivation function to the shared secret.

16. The method of claim 1, comprising performing communication with the second communication device using the session key.

17. A communication device comprising
a communication interface and
a processor configured to
generate a blinding value $s_r$ for a first private key component and a blinding value $e_r$ for a second private key component wherein the blinding value $s_r$ for the first private key component is a value to be combined with the first private key component to mask the first private key component and wherein the blinding value $e_r$ for the second private key component is a value to be combined with the second private key component to mask the second private key component;

generate a blinded public key from the first private key component, the second private key component, the blinding value $s_r$ for the first private key component and the blinding value $e_r$ for the second private key component using a public key generation function;

transmit the blinded public key to another communication device by means of the communication interface for encryption of a shared secret generated by the other communication device;

receive the shared secret from the other communication device by means of the communication interface;

generate a session key for encrypted communication with the other communication device from the shared secret encrypt, using the session key, an information from which the blinding value $s_r$ for the first private key component and the blinding value $e_r$ for the second private key component are derivable by the other communication device; and transmit the encrypted information to the other communication device by means of the communication interface.

18. A method for generating a symmetric session key for encrypted communication with a first communication device, the method being performed by a second communication device, comprising:

Receiving a blinded public key from the first communication device;

Generating a shared secret;

Encrypting the shared secret using the blinded public key;

Transmitting the encrypted shared secret to the first communication device;

Generating a session key for encrypted communication with the first communication device from the shared secret;

Receiving encrypted information from the first communication device, decrypting the information using the session key and deriving a blinding value $s_r$ for a first private key component of the first communication device and a blinding value $e_r$ for a second private key component of the first communication device from the information, wherein the blinding value $s_r$ for the first private key component is a value to be combined with the first private key component to mask the first private key component and wherein the blinding value $e_r$ for the second private key component is a value to be combined with the second private key component to mask the second private key component; and Verifying that the received blinded public key is a public key of the first communication device using the blinding value $s_r$ for the first private key component and the blinding value $e_r$ for the second private key component.

19. The method of claim 18, comprising performing communication with the first communication device using the session key if it has been successfully verified that the received blinded public key is a public key of the first communication device.

20. A communication device comprising
   a communication interface and
   a processor configured to
   receive a blinded public key from another communication device;
   Generate a shared secret;
   Encrypt the shared secret using the blinded public key;
   Transmit the encrypted shared secret to the other communication device;
   Generate a session key from the shared secret;
   Receive encrypted information from the other communication device, decrypt the information using the session key and derive a blinding value $s_r$ for a first private key component of the other communication device and a blinding value $e_r$ for a second private key component of the other communication device from the information, wherein the blinding value $s_r$ for the first private key component is a value to be combined with the first private key component to mask the first private key component and wherein the blinding value $e_r$ for the second private key component is a value to be combined with the second private key component to mask the second private key component; and
   Verify that the received blinded public key is a public key of the other communication device using the blinding value $s_r$ for the first private key component and the blinding value $e_r$ for the second private key component.

* * * * *